(12) United States Patent
Jun et al.

(10) Patent No.: US 8,362,902 B2
(45) Date of Patent: Jan. 29, 2013

(54) RFID READER AND METHOD FOR IDENTIFYING RFID TAG THEREOF AND APPARATUS FOR ANALYZING RECEPTION POWER PATTERN

(75) Inventors: Sungwoo Jun, Daejeon (KR); Ki Hak Kim, Daejeon (KR); Hoon Jung, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 12/841,256

(22) Filed: Jul. 22, 2010

(65) Prior Publication Data
US 2011/0018714 A1    Jan. 27, 2011

(30) Foreign Application Priority Data

Jul. 24, 2009  (KR) .................. 10-2009-0067997
May 11, 2010  (KR) .................. 10-2010-0044127

(51) Int. Cl.
*G08B 13/14* (2006.01)

(52) U.S. Cl. ................. 340/572.4; 340/572.1; 340/10.1; 340/10.4

(58) Field of Classification Search ............... 340/572.4, 340/572.1, 10.1, 10.4, 12.5, 12.51, 13.26; 235/385
See application file for complete search history.

(56) References Cited

U.S. PATENT DOCUMENTS

| | | | | |
|---|---|---|---|---|
| 4,209,783 A * | 6/1980 | Ohyama et al. | ............ | 340/10.42 |
| 6,879,246 B2 * | 4/2005 | Wuidart | ............ | 340/10.2 |
| 7,005,967 B2 * | 2/2006 | Wuidart | ............ | 340/10.4 |
| 7,049,936 B2 * | 5/2006 | Wuidart | ............ | 340/10.4 |
| 7,263,330 B2 * | 8/2007 | Wuidart | ............ | 455/41.1 |

FOREIGN PATENT DOCUMENTS

| | | |
|---|---|---|
| JP | 2007-323423 | 12/2007 |
| KR | 10-2009-0019227 | 2/2009 |
| WO | 2009/025425 A1 | 2/2009 |

\* cited by examiner

*Primary Examiner* — Toan N Pham
(74) *Attorney, Agent, or Firm* — Staas & Halsey LLP

(57) ABSTRACT

A radio frequency identification (RFID) reader may extract a reception from the extracted reception power, and analyze the power pattern. Next, the RFID reader may determine whether the RFID tag is identified based on an power from a tag signal transmitted from an RFID tag, generate a power pattern analysis result of the power pattern.

11 Claims, 4 Drawing Sheets

_US 8,362,902 B2_

RFID READER AND METHOD FOR IDENTIFYING RFID TAG THEREOF AND APPARATUS FOR ANALYZING RECEPTION POWER PATTERN

CROSS-REFERENCE TO RELATED APPLICATION

This application claims priority to and the benefit of Korean Patent Application Nos. 10-2009-0067997 and 10-2010-0044127 filed in the Korean Intellectual Property Office on Jul. 24, 2009 and May 11, 2010, the entire contents of which are incorporated herein by reference.

BACKGROUND OF THE INVENTION (a) Field of the Invention

The present invention relates to a radio frequency identification (RFID) reader and a method for identifying an RFID tag thereof, and an apparatus for analyzing a reception power pattern.

(b) Description of the Related Art

A radio frequency identification (RFID) system includes an RFID reader and an RFID tag. The RFID system indicates a system that may provide various services such as positioning, a remote management, information exchange between objects, and the like in such a manner that the RFID reader identifies the RFID tag attached onto a corresponding object. The RFID system corresponds to a non-contact type identification system and thus may have no need to directly contact the RFID reader with the RFID tag, or to perform scanning within a visible band. Accordingly, the RFID system has been evaluated as technology that may replace a barcode that is a contact-type identification system, and a utilization range of the RFID system is being expanded.

The RFID system uses various frequency bands such as a low frequency (125 KHz, 135 KHz), a high frequency (13.56 MHz), an ultra high frequency (UHF) (433 MHz, 860-960 MHz), a microwave (2.45 GHz), and the like. In each frequency band, a utilization scheme or a utilization range of the RFID system may be different. Particularly, in a UHF band, the RFID system may perform a middle and long distance signal transmission, perform a relatively high speed transmission, and simultaneously identify a plurality of RFID tags. Accordingly, the RFID system is being widely used in all livings including a circulation and a distribution.

However, in a location such as a distribution center or a wholesale store, a plurality of RFID readers are attached to each gate that is an entrance of a product or a pallet and thereby are used. Thus, when the plurality of RFID readers exist in the same location, interference occurs between the RFID readers, which results in deteriorating an identification rate of an RFID tag.

Also, since all of a structure constituting the gate and an adjacent structure are composed of a metal component, reflected waves occur due to them, which may cause an RFID reader attached to the gate to read an undesired RFID tag. In the meantime, when the reflected waves do not occur, however, the undesired RFID tag exists within an identifiable range due to a narrow space, the RFID reader may read the undesired RFID tag. Also, when manufacturing the RFID tag, a difference of an identifiable distance may exist for each RFID tag due to various factors. Due to the difference of the identifiable distance, the RFID reader may also read the undesired RFID tag.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a radio frequency identification (RFID) reader having advantages of reducing an identification rate of an undesired RFID tag, and a method for identifying an RFID tag thereof.

An exemplary embodiment of the present invention provides a method for identifying an RFID tag in an RFID reader. This method includes: receiving a tag signal transmitted from the RFID tag; extracting a reception power from the tag signal; generating a power pattern using the reception power; and determining whether the RFID tag transmitting the tag signal is identified using the power pattern.

Another embodiment of the present invention provides a radio frequency identification (RFID) reader for identifying an RFID tag. This apparatus includes a reader antenna, a coupler, a reception power pattern analyzer, and a controller. The reader antenna may receive a tag signal transmitted from the RFID tag. The coupler may extract a reception power of the tag signal. The reception power pattern analyzer may generate a power pattern using the reception power, and analyze the power pattern. The controller may obtain tag information from the tag signal, and determine a validity of the tag information using an analysis result of the power pattern.

Yet another embodiment of the present invention provides an apparatus for analyzing a reception power pattern. This apparatus includes a collector, a pattern generator, and an analyzer. The collector may collect a reception power of a tag signal transmitted from a radio frequency identification (RFID) tag. The pattern generator may generate a power pattern using the collected reception power. The analyzer may analyze the power pattern, extract a characteristic of the power pattern, and transfer characteristic information of the power pattern to an RFID reader. In this instance, the RFID reader may determine whether the RFID tag transmitting the tag signal is identified based on characteristic information of the power pattern.

DETAILED DESCRIPTION OF THE EMBODIMENTS

Figure 1:
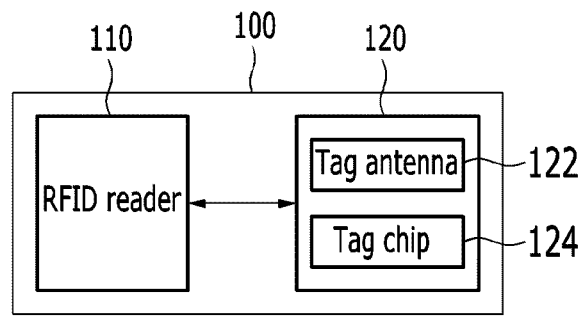
FIG. 1 is a diagram illustrating a radio frequency identification (RFID) system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In specification and claims, unless explicitly described to the contrary, the word "comprise" and variations such as "comprises" or "comprising", will be understood to imply the inclusion of stated elements but not the exclusion of any other elements.

Hereinafter, a radio frequency identification (RFID) reader, a method for identifying an RFID tag thereof, and an apparatus for analyzing a reception power pattern according to an exemplary embodiment of the present invention will be described in detail with reference to the accompanying drawings.

FIG. 1 is a diagram illustrating an RFID system according to an exemplary embodiment of the present invention.

Referring to FIG. 1, an RFID system 100 may include an RFID reader 110 and an RFID tag 120.

The RFID reader 110 may transmit a radio frequency (RF) signal to the RFID tag 120, and receive, from the RFID tag 120, a tag signal responding to the RF signal.

The RFID tag 120 may receive the RF signal transmitted from the RFID reader 110, perform backscattered modulation for the RF signal, and thereby transmit, to the RFID reader 110 via radio wave, the tag signal including a unique identification code and data information (hereinafter, "tag information"), maintained in the RFID tag 120.

The RFID tag 120 may include a tag antenna 122 and a tag chip 124.

The tag antenna 122 may receive the RF signal transmitted from the RFID reader 110, and transfer the received RF signal to the tag chip 124. In this instance, when a magnitude of the RF signal transferred to the tag chip 124 is greater than or equal to a minimum required power for operating the RFID tag 120, the RFID tag 120 may perform backscattered modulation for the RF signal transmitted from the RFID reader 110, and thereby respond to the RF signal transmitted from the RFID reader 110.

The tag information may be stored in the tag chip 124. According to a request of the RFID reader 110 or a circumstance, the tag chip 124 may transmit tag information stored in the tag chip 124 to an outside via the tag antenna 122.

Hereinafter, an operation of the above RFID system will be described.

The RFID reader 110 may transmit, to the RFID tag 120, an RF signal for activating the RFID tag 120. An electromagnetic field, that is, an RF field may be formed using the transmitted RF signal. When the RFID tag 120 enters the RF field, the RFID tag 120 may be activated to respond to the RF signal transmitted from the RFID reader 110 and thereby transmit, to the RFID reader 110, tag information stored in the RFID tag 120. Next, the RFID reader 110 may receive tag information.

Figure 2:
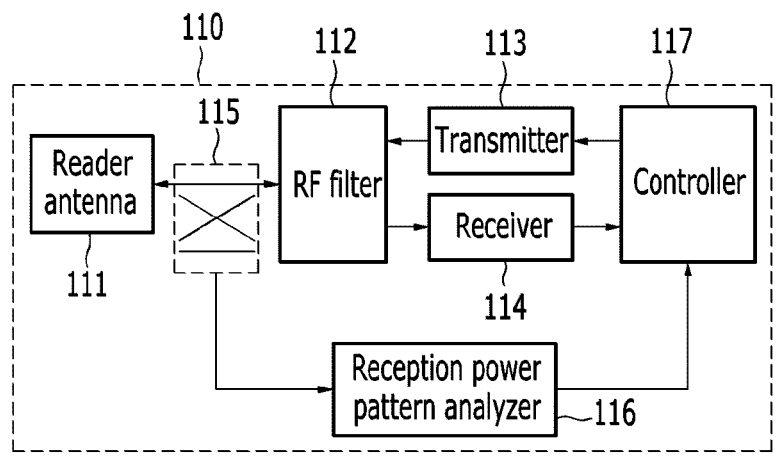
FIG. 2 is a schematic diagram of an RFID reader of FIG. 1.

FIG. 2 is a schematic diagram of the RFID reader 110 of FIG. 1;

Referring to FIG. 2, the RFID reader 110 may include a reader antenna 111, an RF filter 112, a transmitter 113, a receiver 114, a coupler 115, a reception power pattern analyzer 116, and a controller 117.

The reader antenna 111 may receive a tag signal from the RFID tag 120, convert the received tag signal to an electrical signal, and transfer the converted signal to the RF filter 112. Also, the reader antenna 111 may transfer, to the RFID tag 120, an RF signal transferred from the RF filter 112.

The RF filter 112 may filter the signal transferred from the reader antenna 111 to a desired magnitude and frequency, and thereby transfer the filtered signal to the receiver 114. The RF filter 112 may filter the RF signal received via the transmitter 113 to a desired magnitude and frequency and thereby transfer the filtered signal to the reader antenna 111.

The transmitter 113 may transfer, to the RF filter 112, the RF signal caused by the controller 170.

The receiver 114 may demodulate the signal filtered by the RF filter 112 and thereby restore the signal to a source signal, and transfer the demodulated signal to the controller 117.

The coupler 115 may extract a predetermined ratio of a reception power of the tag signal received from the RFID tag 120, and transfer the extracted reception power to the reception power pattern analyzer 116.

The reception power pattern analyzer 116 may generate a power pattern using the reception power extracted by the coupler 115, analyze the generated power pattern, and transfer an analysis result to the controller 117. The reception power pattern analyzer 116 may be configured within the RFID reader 110, or may also be configured as an independent apparatus.

The controller 117 may obtain tag information from the signal transferred from the receiver 114, and may store and manage the obtained tag information. The controller 117 may generate the RF signal for activating the RFID tag 120, and transmit the RF signal to the RFID tag 120 via the transmitter 113.

Also, the controller 117 may determine a validity of tag information transferred via the receiver 114, using a power pattern analysis result from the reception power pattern analyzer 116. Next, when the controller 117 determines that the tag information transferred via the receiver 114 is invalid, the controller 117 may delete the tag information. When the controller 117 determines that the tag information transferred via the receiver 114 is valid, the controller 117 may maintain the tag information. In this instance, tag information obtained from the signal transferred via the receiver 114 may be synchronized with the power pattern analysis result analyzed from the signal transferred via the receiver 114. Accordingly, the controller 117 may classify an RFID tag desiring to be identified and an RFID tag not desiring to be identified, using the power pattern analysis result from the power reception pattern analyzer 116, and may maintain tag information of the RFID tag desiring to be identified and delete tag information of the RFID tag not desiring to be identified.

Hereinafter, a method for classifying, by the controller 117, an RFID tag desiring to be identified and an RFID tag not desiring to be identified using a power pattern analysis result will be described with reference to FIG. 3 to FIG. 5.

Figure 3:
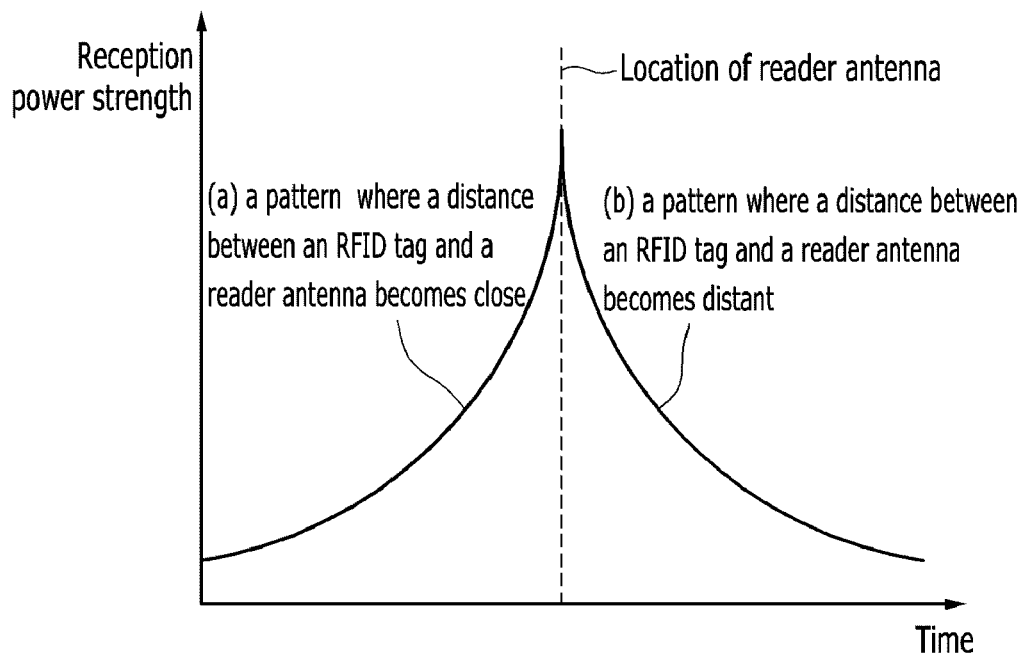
FIG. 3 and FIG. 4 are diagrams respectively illustrating a power pattern of a moving RFID tag and a power pattern of a stationary RFID tag.
Figure 4:
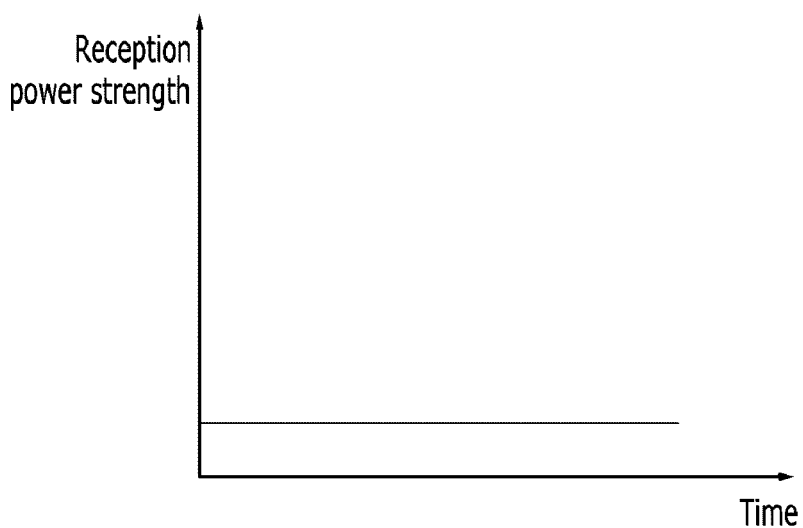
Figure 5:
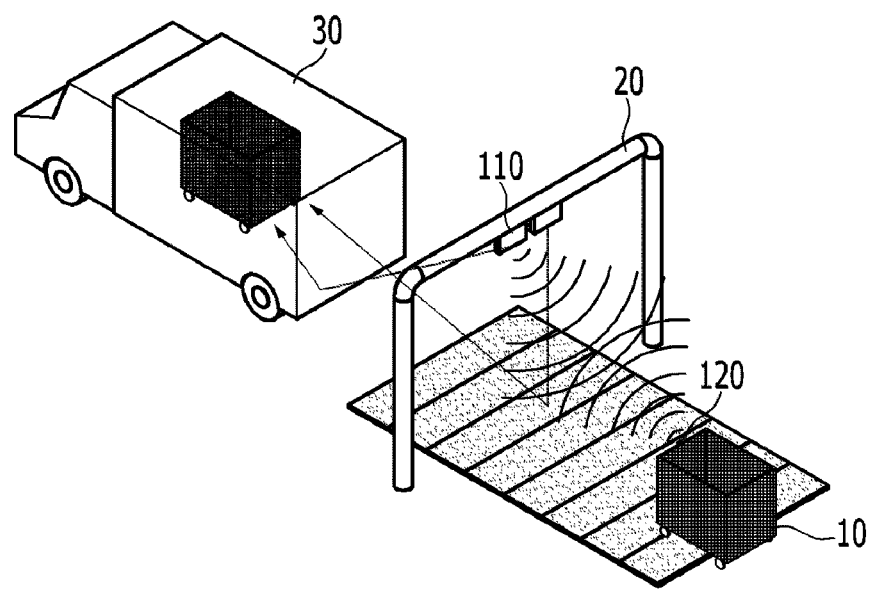
FIG. 5 is a diagram illustrating an RFID reader installed in a location such as a distribution center or a wholesale store.

FIG. 3 and FIG. 4 are diagrams respectively illustrating a power pattern of a moving RFID tag and a power pattern of a stationary RFID tag, and FIG. 5 is a diagram illustrating an RFID reader installed in a location such as a distribution center or a wholesale store.

Equation 1 indicates a FRIIS transmission equation to calculate a radio wave arrival distance.

$$P_{tag\_RX} = P_{reader\_TX} + G_{reader\_TX} + G_{tag\_RX} - 20\log_{10}\left(\frac{4\pi}{\lambda}\right) - 20\log_{10}R \quad \text{(Equation 1)}$$

In equation 1, $P_{Tag\_RX}$ denotes the reception power, $G_{Tag\_RX}$ denotes a gain of the tag antenna 122, $P_{Reader\_TX}$ denotes a gain of the reader antenna 111, and R denotes a distance between the RFID tag 120 and the reader antenna 111.

The reception power by equation 1 may be calculated as given by equation 2.

$$P_{log\_RX} = \left(\frac{\lambda}{4\pi R}\right)^2 G_{reader\_TX} G_{tag\_RX} P_{reader\_TX} \quad \text{(Equation 2)}$$

It can be known from equation 1 that a pattern of a reception power with respect to the RFID tag 120 passing through the reader antenna 111 and the stationary RFID tag 120 varies according to a distance between the RFID tag 120 and the reader antenna 111.

Also, it can be known from equation 2 that the reception power is in inverse proportion to the distance between the RFID tag 120 and the reader antenna 111. Specifically, a power pattern of a tag signal transmitted from the RFID tag 120 moving towards the reader antenna 111 is illustrated in (a) of FIG. 3. The power pattern of the tag signal transmitted from the RFID tag 120 moving away from the reader antenna 111 is illustrated in (b) of FIG. 3. Also, the power pattern of the tag signal transmitted from the stationary RFID tag 120 is illustrated in FIG. 4.

As described above, the power pattern of the tag signal transmitted from the RFID tag 120 varies according to the distance between the RFID tag 120 and the reader antenna 111. Accordingly, when using the power pattern of the tag signal transmitted from the RFID tag 120, it is possible to classify an RFID tag desiring to be identified and an RFID tag not desiring to be identified.

That is, the controller 117 according to an exemplary embodiment of the present invention may compare the power pattern of the tag signal transmitted from the RFID tag 120 with a predetermined power pattern and thereby classify the RFID tag desiring to be identified and the RFID tag not desiring to be identified.

In a location such as a distribution center or a wholesale store, an RFID reader is attached to each gate that is an entrance of a product or a pallet attached with an RFID tag, and thereby is used. For example, as shown in FIG. 5, when there is a need to load, to a vehicle 30 via a gate 20, a product or a pallet 10 attached with the RFID tag 120, the product or the pallet 10 may approach close to a reader antenna 111 of the RFID reader 110 whereby a power pattern moving away from the reader antenna 111 may appear. Accordingly, the controller 117 may set the power pattern of FIG. 3 as the preset power pattern. Then, when the power pattern of the tag signal transmitted from the RFID tag 120 satisfies the power pattern of FIG. 3, the controller 117 may maintain tag information of the corresponding RFID tag 120, and otherwise, may delete the tag information of the corresponding RFID tag 120.

Figure 6:
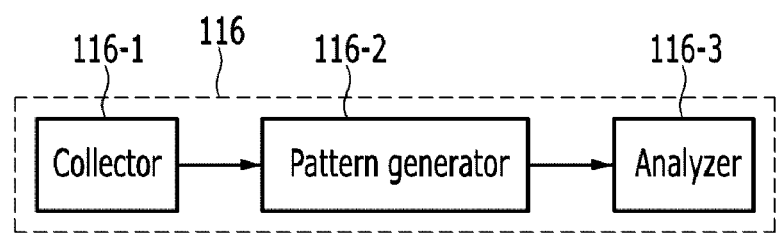
FIG. 6 is a schematic diagram of a reception power pattern analyzer of FIG. 2.

FIG. 6 is a schematic diagram of the reception power pattern analyzer 116 of FIG. 2.

Referring to FIG. 6, the reception power pattern analyzer 116 may include a collector 116-1, a pattern generator 116-2, and an analyzer 116-3.

The collector 116-1 may collect, for each RFID tag, a reception power of a tag signal extracted via the coupler 115. In this instance, the collector 116-1 may collect, for each time, the reception power of the tag signal detected after the RFID reader 110 initially detects the tag signal.

The pattern generator 116-2 may generate a power pattern using the reception power collected by the collector 116-1, and manage the generated power pattern for each RFID tag. The pattern generator 116-2 may generate the reception power collected by the collector 116-1 as the power pattern having a linearization and a regularity according to various schemes such as an abnormal value analysis, a linear regression analysis algorithm, a differentiation, and the like.

The analyzer 116-3 may analyze the power pattern generated by the pattern generator 116-2 and transfer an analysis result to the controller 117. Next, the controller 117 may determine a validity of tag information based on the analysis result. That is, the analyzer 116-3 may induce a characteristic of the power pattern using a slope of the power pattern, a pattern shape, and the like. The controller 117 may determine the validity of tag information by comparing the slop of the power pattern, the pattern shape, and the like with a predetermined slop of the power pattern, a pattern shape, and the like.

Figure 7:
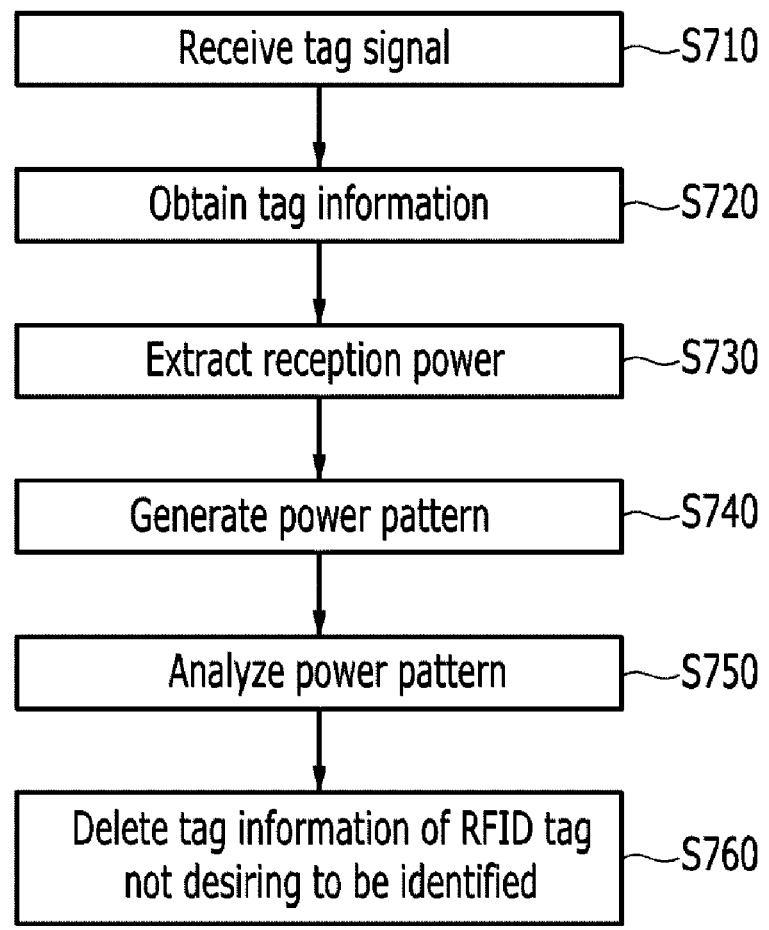
FIG. 7 is a flowchart illustrating a method for identifying an RFID tag according to an exemplary embodiment of the present invention.

FIG. 7 is a flowchart illustrating a method for identifying an RFID tag according to an exemplary embodiment of the present invention.

Referring to FIG. 7, when a tag signal is transmitted from the RFID tag 120, the RFID reader 110 may receive the tag signal transmitted from the RFID tag 120 (S710), and obtain and store tag information from the received tag signal (S720).

Also, the RFID reader 110 may extract a predetermined ratio of a reception power from the received tag signal (S730), and generate a power pattern using the extracted reception power (S740). Next, the RFID reader 110 may analyze the generated power pattern (S750). The RFID reader 110 may delete tag information of an RFID tag not desiring to be identified by comparing an analysis result of the power pattern with a predetermined power pattern and by classifying an RFID tag desiring to be identified and the RFID tag not desiring to be identified (S760).

According to an exemplary embodiment of the present invention, it is possible to decrease a probability of identifying an undesired RFID tag, and thereby enhancing an identification rate of an RFID tag.

The above-mentioned exemplary embodiments of the present invention are not embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for identifying a radio frequency identification (RFID) tag in an RFID reader, comprising:
   receiving a tag signal transmitted from the RFID tag;
   extracting a reception power from the tag signal;
   generating a power pattern using the reception power; and
   determining whether the RFID tag transmitting the tag signal is identified using the power pattern.

2. The method of claim 1, further comprising:
   obtaining and storing tag information from the tag signal, wherein the determining includes:
   extracting a characteristic of the power pattern;
   comparing the characteristic of the power pattern with a characteristic of a reference power pattern; and deleting the tag information when the characteristic of the power pattern does not satisfy the characteristic of the reference power pattern.

3. The method of claim 2, wherein:
the characteristic of the power pattern includes a slope or a pattern shape.

4. The method of claim 1, wherein:
the generating includes
generating the power pattern from the reception power using at least one of an abnormal value analysis, a linear regression analysis algorithm, and a differentiation.

5. A radio frequency identification (RFID) reader for identifying an RFID tag, comprising:
a reader antenna to receive a tag signal transmitted from the RFID tag;
a coupler to extract a reception power of the tag signal;
a reception power pattern analyzer to generate a power pattern using the reception power, and to analyze the power pattern; and
a controller to obtain tag information from the tag signal, and to determine a validity of the tag information using an analysis result of the power pattern.

6. The RFID reader of claim 5, wherein:
the reception power pattern analyzer includes:
a collector to collect the reception power of the tag signal;
a pattern generator to generate the power pattern using the collected reception power; and
an analyzer to analyze the generated power pattern, to extract a characteristic of the power pattern, and to transfer the extracted characteristic of the power pattern to the controller.

7. The RFID reader of claim 6, wherein:
the collector collects the reception power for each time from the tag signal detected after the tag signal is initially detected.

8. The RFID reader of claim 6, wherein:
the controller deletes the obtained tag information when the characteristic of the power pattern does not satisfy a pattern of a reference power pattern.

9. The RFID reader of claim 5, further comprising:
a transmitter to transmit a radio frequency signal to the RFID tag,
wherein in response to the radio frequency signal, the tag signal is transmitted from the RFID tag.

10. An apparatus for analyzing a reception power pattern, comprising:
a collector to collect a reception power of a tag signal transmitted from a radio frequency identification (RFID) tag;
a pattern generator to generate a power pattern using the collected reception power; and
an analyzer to analyze the power pattern, to extract a characteristic of the power pattern, and to transfer characteristic information of the power pattern to an RFID reader,
wherein the RFID reader determines whether the RFID tag transmitting the tag signal is identified based on characteristic information of the power pattern.

11. The apparatus of claim 10, wherein:
the pattern generator generates the power pattern from the reception power using at least one of an abnormal value analysis, a linear regression analysis algorithm, and a differentiation.

* * * * *